May 16, 1933.  J. F. BERLINER  1,909,606
MINERAL CONVERSION
Filed Jan. 21, 1930
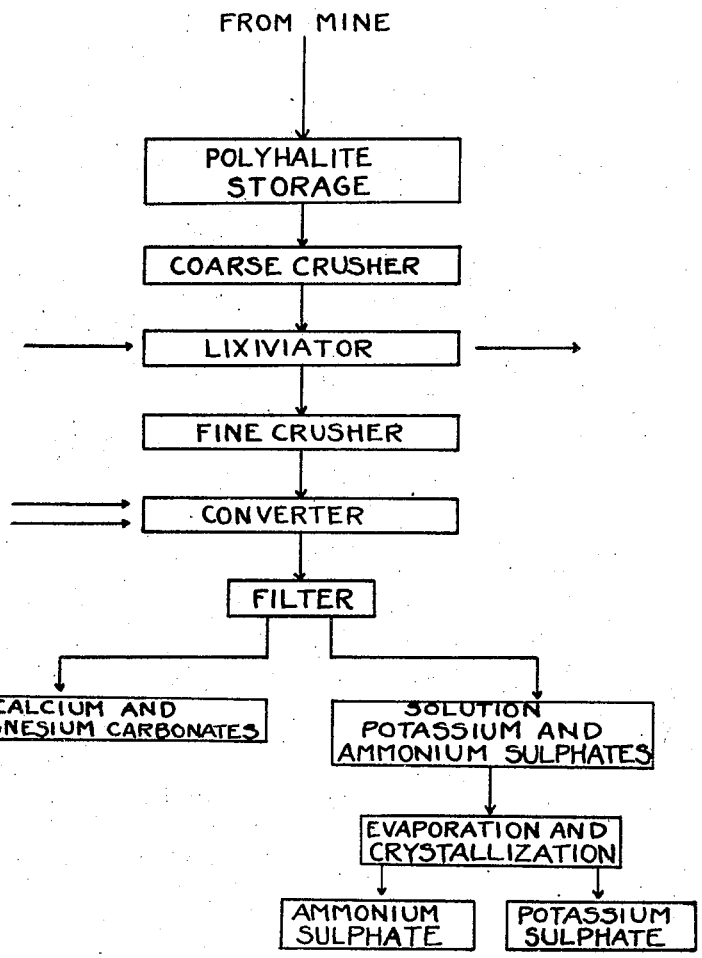
INVENTOR.
JULIUS F. T. BERLINER
BY
*W.R. Gawthrop*
ATTORNEY.

Patented May 16, 1933         1,909,606

UNITED STATES PATENT OFFICE

JULIUS F. BERLINER, OF WILMINGTON, DELAWARE, ASSIGNOR, BY MESNE ASSIGNMENTS, TO E. I. DU PONT DE NEMOURS & COMPANY, OF WILMINGTON, DELAWARE, A CORPORATION OF DELAWARE

MINERAL CONVERSION

Application filed January 21, 1930. Serial No. 422,493.

This invention relates to the manufacture of potassium salts from potassium-bearing minerals and particularly to a method for opening up the mineral polyhalite.

Numerous processes have been devised for obtaining potassium salts from crude potassium-bearing minerals, great quantities of these salts being produced and utilized every year especially in the fertilizer industry. One of the more abundant potassium-containing minerals is polyhalite, occurring in the United States in northwestern Texas and southeastern New Mexico in relatively large quantities as flat or slightly dipping strata of varying thickness.

This mineral is composed of the sulfates of potassium, magnesium, and calcium as represented by the formula $K_2SO_4 \cdot MgSO_4 \cdot 2CaSO_4 \cdot 2H_2O$. An analysis of the typical Texas-New Mexico mineral is as follows:

| | Percent |
|---|---|
| $K_2SO_4$ | 25.4 |
| $MgSO_4$ | 20.0 |
| $CaSO_4$ | 47.2 |
| $H_2O$ | 1.8 |
| $NaCl$ | 5.2 |
| $Fe_2O_3 + SiO_2$ | .4 |

Owing to its relative insolubility, the mineral itself, which is ordinarily of reddish color and very hard, has not successfully been decomposed by a simple leaching process. In fact, no satisfactory process for working it up has been known.

It is the object of the present invention to provide a method for converting polyhalite into valuable salts, particularly potassium and ammonium sulfates.

It is a further object of the invention to produce the aforesaid salts from polyhalite, ammonia, and carbon dioxide.

Other objects of the invention will be apparent as it is better understood by reference to the following specification in which its details and preferred embodiments are described.

According to the present invention, I produce valuable salts, particularly potassium and ammonium sulfates or mixtures thereof, by reacting polyhalite with ammonia and carbon dioxide in the presence of water. This is accomplished by suspending finely crushed or ground polyhalite in water and introducing thereto ammonia and carbon dioxide, as such or as salts that can be prepared therefrom, to effect the conversion of the polyhalite to soluble and insoluble salts, chiefly, potassium sulfate, ammonium sulfate, and carbonates of magnesium and calcium together with some impurities, and recovering said salts, alone or in admixture, from the liquid and solid phases in the manner hereinafter set forth. In its simplest form, the reaction takes place in accordance with the following equation:

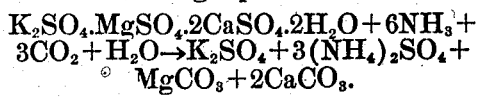

$$K_2SO_4 \cdot MgSO_4 \cdot 2CaSO_4 \cdot 2H_2O + 6NH_3 + 3CO_2 + H_2O \rightarrow K_2SO_4 + 3(NH_4)_2SO_4 + MgCO_3 + 2CaCO_3.$$

It should be noted that, whereas previously proposed processes for decomposing polyhalite have had as their sole object the recovery of potassium compounds, the present process serves the purpose of producing ammonium sulfate as well as potassium sulfate while securing practically complete conversion of the mineral to other useful products, viz., magnesium and calcium carbonates, which may be advantageously used in the preparation of various types of fertilizers.

If an analysis of the polyhalite shows the presence of appreciable quantities of an impurity, such as sodium chloride, I prefer to remove this prior to the treatment with ammonia and carbon dioxide. Inasmuch as sodium chloride is not uniformly distributed through the mineral but rather occurs in strata of varying thickness, this preliminary separation may conveniently be accomplished by coarse grinding and a quick leaching with water, for example, by countercurrent leaching wherein the leach solution is discarded only when it becomes saturated with respect to sodium chloride; or, if desired, a dry separation may be effected by treating the ground product in one of the various known types of concentrators.

The product of the preliminary treatment is normally subjected to finer grinding, suspended in water, and reacted with ammonia and carbon dioxide to convert the remaining constituents thereof to the aforementioned salts, namely, potassium sulfate, ammonium sulfate, calcium carbonate and magnesium carbonate. The proportions of these salts present in the liquid and solid phases of the conversion product will depend largely upon the quantity of water employed. Thus, prior to or during the ammonia-carbon dioxide treatment, I may add to the reaction mixture sufficient or excess water to dissolve substantially all of the potassium and ammonium sulfates formed, leaving a solid phase consisting of magnesium carbonate, calcium carbonate and some impurities; or, for the purpose of subsequent separation of the salts or salt mixtures, I may limit the proportions of water employed to cause the precipitation of part or all of the potassium sulfate or ammonium sulfate along with the magnesium and calcium carbonates.

In practicing the invention, I have observed that the polyhalite-water mixture may be relatively fluid or slushy depending upon the proportions of water employed and that especially when using more limited proportions of water a proper commingling of the reactants may not be obtained unless pains are taken during the addition of ammonia and carbon dioxide to provide adequate stirring or agitating of the polyhalite suspension.

As previously indicated, ammonia and carbon dioxide may be used as such or they may be replaced in part or in toto by ammonium salts derived therefrom, such as ammonium carbonate, bicarbonate, or carbamate, or mixtures thereof, the proportions of these ingredients employed depending largely upon the chemical nature of the polyhalite and the desired proportions of the various salts in the liquid and solid phases of the reaction product. It is to be understood, therefore, that in the present specification and appended claims ammonia and carbon dioxide are to be considered as the equivalents of the aforementioned salts thereof.

Practical trial has demonstrated that the degree of decomposition of the polyhalite (based upon the ratio of (SO$_4$) originally present to that in the solution obtained by the NH$_3$—CO$_2$ conversion) is proportional to the quantities of ammonia and carbon dioxide employed. This is shown by the following application of the process to a polyhalite of the approximate composition previously stated, employing (1) less technical ammonium carbonate (a mixture of ammonium carbamate and ammonium bicarbonate analyzing about 31% NH$_3$ and 55% CO$_2$) than is chemically equivalent to the magnesium and calcium sulfates in the mineral, and (2) somewhat of an excess of technical ammonium carbonate. (Figures are given in parts by weight unless otherwise specified):

| No. | Polyhalite | Technical ammonium carbonate | Water | Percent conversion of polyhalite |
|---|---|---|---|---|
| 1 | 72.8 | 28 | 210 | 71 |
| 2 | 72.8 | 56 | 210 | 95 |

Moreover, I have ascertained that the extraction of potassium sulfate from the mineral is likewise a function of the proportions of ammonia and carbon dioxide used, as demonstrated by the following examples:

| No. | Polyhalite | Technical ammonium carbonate | Water | Percent extraction of K$_2$SO$_4$ |
|---|---|---|---|---|
| 1 | 72.8 |  | 210 | 43 |
| 2 | 72.8 | 28 | 210 | 53 |
| 3 | 72.8 | 56 | 210 | 98 |

Therefore, it will be apparent that although the amounts of ammonia and carbon dioxide employed may vary within relatively wide limits, it is better to use proportions at least equal to and preferably in excess of that chemically equivalent to the sulfates of magnesium and calcium. Generally speaking, I have found that the process may be satisfactorily carried out by employing ammonia and carbon dioxide, as such or as salts, in proportions corresponding to 1.5 to 3 moles of ammonia and 1 to 2 moles of carbon dioxide per mole of magnesium and calcium sulfates in the polyhalite.

When using sufficient or excess water in the reaction solution to dissolve the potassium sulfate and ammonium sulfate, I obtain these substances therefrom in any suitable manner but preferably by (1) evaporation of the solution to dryness, or (2) evaporation coupled with fractional crystallization. In the latter case, two fractions, the first relatively high in potassium and the second relatively high in ammonium sulfate, may be obtained. For example, this is accomplished by evaporating a portion of the total water and separating a fraction relatively high in potassium sulfate (first fraction), thereafter completing the evaporation and separating a salt mixture relatively high in ammonium sulfate (second fraction). These fractions may be subjected to further fractionation or used as such, for instance, as fertilizer salts or in fertilizer manufacture.

Inasmuch as potassium and ammonium sulfates form a series of mixed crystals when in equilibrium with an aqueous solution, almost any desired composition of a salt mixture may be produced as above described by varying the proportions of water evaporated and the temperatures of operation.

While it is to be understood that the invention herein described is susceptible of considerable variation and modification in the manner of its practical application, particularly as regards proportions of materials and specific conditions of operation the following example will serve to illustrate how the invention may be practiced.

One hundred seven and one-half parts by weight of a polyhalite mineral of the following approximate composition is subjected to coarse crushing and counter current leaching with water to largely remove the sodium chloride:

| | Percent |
|---|---|
| $K_2SO_4$ | 25.4 |
| $MgSO_4$ | 20.0 |
| $CaSO_4$ | 47.2 |
| $Al_2O_3$, $F_2O_3$, $SiO_2$ (impurities) | 1.8 |
| NaCl | 5.2 |
| $H_2O$ | 0.4 |

The leached material, consisting of approximately 27.4 parts by weight of $K_2SO_4$, 21.5 parts of $MgSO_4$, 50.6 parts of $CaSO_4$, and 2 parts impurities, is finely ground, mixed with 250 parts by weight of water and to the mixture about 52.8 parts by weight of technical ammonium carbonate is added while agitating thoroughly, the proportions of ammonia and carbon dioxide thereby introduced being approximately chemically equivalent to the magnesium and calcium sulfates. The conversion product, comprising a liquid and a solid phase, is filtered to separate the latter, which consists largely of magnesium and calcium carbonates with some impurities.

The filtrate, containing substantially all of the potassium and ammonium sulfate and comprising about 27.4 parts of $K_2SO_4$, 72.6 parts of $(NH_4)_2SO_4$ and 250 parts of water, may be treated in any suitable manner to obtain therefrom the salts of ammonium or potassium either alone or in admixture. Thus, as previously indicated, I may evaporate the above solution almost to dryness and on cooling to ordinary temperature (25° C.) obtain a mixed salt containing about 27.4 parts by weight of $K_2SO_4$ and 72.6 parts of $(NH_4)_2SO_4$. Or I may couple evaporation with fractionation to produce products of various compositions, for example, by evaporating about 76 parts of water from the above solution and centrifuging the cooled product to obtain a first fraction high in potassium sulfate and consisting of approximately 78% $K_2SO_4$ and 22% $(NH_4)_2SO_4$. By evaporating substantially all the water from the remaining solution, cooling and centrifuging, there results a second and final fraction comprising about 20% $K_2SO_4$ and 80% $(NH_4)_2SO_4$.

Further variation in the composition of the final product may be obtained, for instance, by altering the degree of evaporation and the temperature of crystallization. Furthermore, it will be recognized that fractions higher in one or the other of the component salts may be produced by redissolving in water fractions as here obtained and continuing the fractionation in a similar manner.

Various changes may be made in the method described without departing from the invention or sacrificing any of the advantages thereof.

I claim:

1. The process of converting polyhalite into valuable salts which comprises reacting the mineral with ammonia, carbon dioxide and water to produce potassium and ammonium sulphates and calcium and magnesium carbonates.

2. A process as in claim 1, including the preliminary step of leaching the mineral with water to remove sodium chloride therefrom.

3. The process of producing valuable salts which comprises reacting ammonia and carbon dioxide with crushed polyhalite in the presence of water so regulated in amount as to yield a conversion product containing at least a part of the potassium and ammonium sulfates in solution and substantially all of the carbonates of magnesium and calcium in solid phase, and recovering the salts from said conversion product.

4. The process of producing valuable salts which comprises reacting ammonia and carbon dioxide with crushed polyhalite in the presence of water so regulated in amount as to yield a conversion product containing substantially all of the potassium and ammonium sulfates in solution and substantially all of the carbonates of magnesium and calcium in solid phase, and recovering the salts from said conversion product.

5. The process of producing valuable salts which comprises reacting crushed polyhalite in the presence of water, with proportions of ammonia and carbon dioxide at least chemically equivalent to the sulfates of magnesium and calcium in the mineral, while regulating the amount of water present to yield a conversion product containing substantially all of the potassium and ammonium sulfates in solution and substantially all of the carbonates of magnesium and calcium in solid phase, and recovering these salts, from said conversion product.

6. The process of producing valuable salts which comprises reacting crushed polyhalite in the presence of water with proportions of ammonia and carbon dioxide in excess of that chemically equivalent to the sulfates of magnesium and calcium in the mineral, while regulating the amount of water present to yield a conversion product containing substantially all of the potassium and ammonium sulfates in solution and substantially all of the carbonates of magnesium and calcium in solid phase, and recovering these salts from said conversion product.

7. The process of producing valuable salts and/or salt mixtures which comprises mixing crushed polyhalite in the presence of water with ammonia and carbon dioxide, employing from 1.5 to 3 moles of ammonia and from 1 to 2 moles of carbon dioxide per mole of magnesium and calcium sulfates in the mineral, while regulating the proportions of water present to yield a conversion product containing substantially all of the potassium and ammonium sulfates in solution and substantially all of the magnesium and calcium carbonates in solid phase, and recovering these salts from said conversion product.

8. The process of producing valuable salts which comprises mixing crushed polyhalite in the presence of water with ammonia and carbon dioxide, introduced at least in part in the form of a compound thereof, and using proportions corresponding to 1.5 to 3 moles of ammonia and 1 to 2 moles of carbon dioxide per mole of magnesium and calcium sulfates in the mineral, while regulating the proportions of water present to yield a conversion product containing substantially all of the potassium and ammonium sulfates in solution and substantially all of the magnesium and calcium carbonates in solid phase, and recovering these salts from said conversion product.

9. The process of producing valuable salts, particularly potassium and ammonium sulfates, or mixtures thereof, which comprises mixing crushed polyhalite in the presence of water with ammonia and carbon dioxide, employing from 1.5 to 3 moles of ammonia and from 1 to 2 moles of carbon dioxide per mole of magnesium and calcium sulfates in the mineral, while regulating the proportions of water present to yield a conversion product containing substantially all of the potassium and ammonium sulfates in solution and substantially all of the magnesium and calcium carbonates in solid phase, separating the aforesaid solid phase by filtration, evaporating the filtrate and separating potassium and ammonium sulfates therefrom by fractional crystallization.

10. The process of converting polyhalite to valuable salts particularly potassium and ammonium sulfates, or mixtures thereof, which comprises reacting the mineral with ammonia, carbon dioxide, and water, while regulating the proportions of water to yield a conversion product containing substantially all of the potassium and ammonium sulfates in solution and substantially all of the magnesium and calcium carbonates in solid phase, separating the aforesaid solid phase by filtration, evaporating the filtrate and separating potassium and ammonium sulfates therefrom by fractional crystallization.

11. The process of producing valuable salts which comprises reacting polyhalite in the presence of water with proportions of ammonia and carbon dioxide at least chemically equivalent to the sulfates of magnesium and calcium in the mineral to produce potassium and ammonium sulfates and calcium and magnesium carbonates.

12. The process of producing valuable salts which comprises reacting polyhalite in the presence of water with 1.5 to 3 moles of ammonia and 1 to 2 moles of carbon dioxide per mole of magnesium and calcium sulfates in the mineral to produce potassium and ammonium sulfates and calcium and magnesium carbonates.

13. The process of producing valuable salts which comprises reacting polyhalite in the presence of water with ammonia and carbon dioxide, introduced at least in part in the form of a compound thereof, to produce potassium and ammonium sulfates and calcium and magnesium carbonates.

14. The process of converting polyhalite to a valuable mixture of potassium and ammonium sulfates which comprises reacting the mineral with ammonia, carbon dioxide, and water, while regulating the proportions of water to yield a conversion product containing substantially all of the potassium and ammonium sulfates in solution and substantially all of the magnesium and calcium carbonates in solid phase, separating the aforesaid solid phase by filtration, and evaporating substantially all of the water from the filtrate to produce a mixture of potassium and ammonium sulfates.

15. The process of producing a valuable mixture of potassium and ammonium sulfates which comprises mixing crushed polyhalite in the presence of water with ammonia and carbon dioxide, employing from 1.5 to 3 moles of ammonia and from 1 to 2 moles of carbon dioxide per mole of magnesium and calcium sulfates in the mineral, while regulating the proportions of water present to yield a conversion product containing substantially all of the potassium and ammonium sulfates in solution and substantially all of the magnesium and calcium carbonates in solid phase, separating the aforesaid solid phase by filtration and evaporating the filtrate to dryness to produce a mixture of potassium and ammonium sulfates.

In testimony whereof, I affix my signature.

JULIUS F. BERLINER.